United States Patent
Knapp et al.

[11] 3,863,357
[45] Feb. 4, 1975

[54] POWER DRIVEN BAND CLAMP FOR PENDULOUS NORTH SEEKING GYROSCOPES

[75] Inventors: Ralph E. Knapp, Canoga Park; David C. Clark, Los Angeles, both of Calif.

[73] Assignee: Lear Siegler Inc., Santa Monica, Calif.

[22] Filed: June 23, 1972

[21] Appl. No.: 265,758

[52] U.S. Cl. ............................................... 33/324
[51] Int. Cl. ............................................. G01c 19/38
[58] Field of Search ............ 33/324, 325, 326, 327

[56] References Cited
UNITED STATES PATENTS
| | | | |
|---|---|---|---|
| 1,628,136 | 5/1927 | Ford | 33/326 |
| 1,749,059 | 3/1930 | Bassett | 33/327 |
| 3,512,264 | 5/1970 | Ambrosini | 33/324 |

*Primary Examiner*—Louis R. Prince
*Assistant Examiner*—Richard R. Stearns
*Attorney, Agent, or Firm*—Jackson & Jones

[57] ABSTRACT

A pendulum of a north seeking gyroscope is supported by a suspension band and is connected to the band by a movable pivot arm. The pivot arm permits the support point to be moved relative to the pendulum during its period in order to shorten the natural period of the north seeking gyroscope. A solenoid actuates the pivot arm in response to control signals which may be existing pick-off signals. Alternatively, the control signals may be provided by an electrolytic level transducer having an output signal proportional to the tilt angle and a phase indicative of tilt direction can be mounted on the gyroscope.

18 Claims, 6 Drawing Figures

POWER DRIVEN BAND CLAMP FOR PENDULOUS NORTH SEEKING GYROSCOPES

BACKGROUND OF THE INVENTION

1. Field of the Invention

This invention relates to a meridian seeking gyroscope and, more particularly, to apparatus for obtaining short natural periods in pendulous gyroscopes.

2. Description of the Prior Art

Attempts have been made in the prior art to provide a reduction in the overall response time of gyroscopes by decreasing the pendulum period. This has been of particular importance in mobile compact gyroscope units adapted by widespread use. The period of a gyroscope is described by the relation $P = \sqrt{M/H\Omega \cos \lambda}$ where M is the pendulous moment, H is the gyro wheel angular momentum, $\lambda$ is the latitude and $\Omega$ is the earth rate. Various attempts have been made to decrease the period by increasing the weight and thereby increasing the pendulous moment M but it has been found that this affects the accuracy of the gyroscope and further requires among other things in a pendulous gyro as disclosed in the Ambrosini U.S. Pat. No. 3,512,264 granted May 19, 1970, a stiffer suspension band. As an alternative method of decreasing the pendulum period, the pendulum length has been increased to provide a faster response time but this generally increases both the size and the overall weight of the gyroscope. With the use of long pendulums, the gyroscope instrument is especially susceptible to rectification effects particularly from wind buffeting.

It became apparent that numerous problems are associated with an extremely sensitive gyroscope instrument where the introduction of a torque error in the range of 0.01 dyne · cm will at mid latitudes (i.e., 34°) produce roughly a ten second read-out error in the gyro unit. Increasing the size of the pendulum makes the instrument subject to minuscule problems that would not be immediately apparent to the eye of the casual observer such as the air bubble or sail effect resulting from the heat currents produced by the gyro motor which will produce a convective air flow force with a resultant torque error introduced into the gyro system. Basically, the prime design requirements in a gyroscope system have been to provide a fast response time while maintaining a high degree of accuracy. As mentioned above, the prior art has sought to meet these design requirements by either increasing the weight of the pendulum or by providing a longer pendulum unit, neither of which have been satisfactory in a compact mobile gyroscope unit.

SUMMARY OF THE INVENTION

The present invention is capable of producing the effects of a long pendulum yet retain the advantages of a short coupled pendulum by increasing the torque about the elevation axis at select times in the period of the pendulum. This is accomplished by displacing the attachment point of the pendulum suspension member away from the inclined end of the gyro spin axis as the inclination increases. This displacement of the attachment point causes a torque about the east-west axis of a north seeking gyro unit which decreases the spin axis inclination angle and increases the precession rate. Basically, this is accomplished by providing a torquer to physically displace the suspension point at the desired time in the precession.

The torquer can comprise one or more solenoid coils and an armature core and is designed to be as light as possible. The displacement can be provided at a varying rate in response to the optimum torque/voltage gain relationship. In addition, a follow-up servo member can supply a positive feedback signal to the torquer which would cause the desired torque about the pendulum elevation axis. As an alternative, an auxiliary accelerometer such as an electrolytic level transducer may be mounted on the pendulum and may be used as a sensor in activating the torquer.

DESCRIPTION OF THE PREFERRED EMBODIMENT

Generally, there are four different types of torques acting on a gyro unit such as: gyroscopic reaction torques, damping torques, acceleration torques, and gravitational torques. The gyroscopic reaction torques are a product of the various velocity components perpendicular to the spin axis of the gyro and of the angular momentum H. The direction of these torques is such that they tend to rotate the spin axis into parallelism with the vector representing the forced precession.

The damping torque about the horizontal axis can be generally ignored because of the extremely low value of the velocity about this axis. However, the damping torque due to the velocity about the vertical axis must be taken into account. This damping torque will always be in a direction opposite to that of the velocity.

The acceleration torques are due to the acceleration of the inertia of the gyro and the gyro container about two axis of rotation, the vertical axis of symmetry and the horizontal lateral axis through the lower point of suspension.

Figure 2:
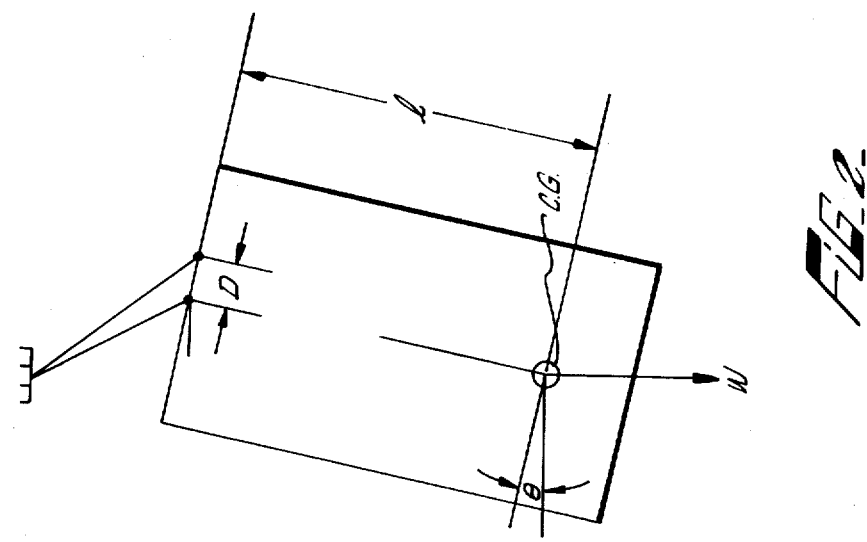
FIG. 2 is a mathematical diagram of the pendulum lateral displacement.
Figure 1:
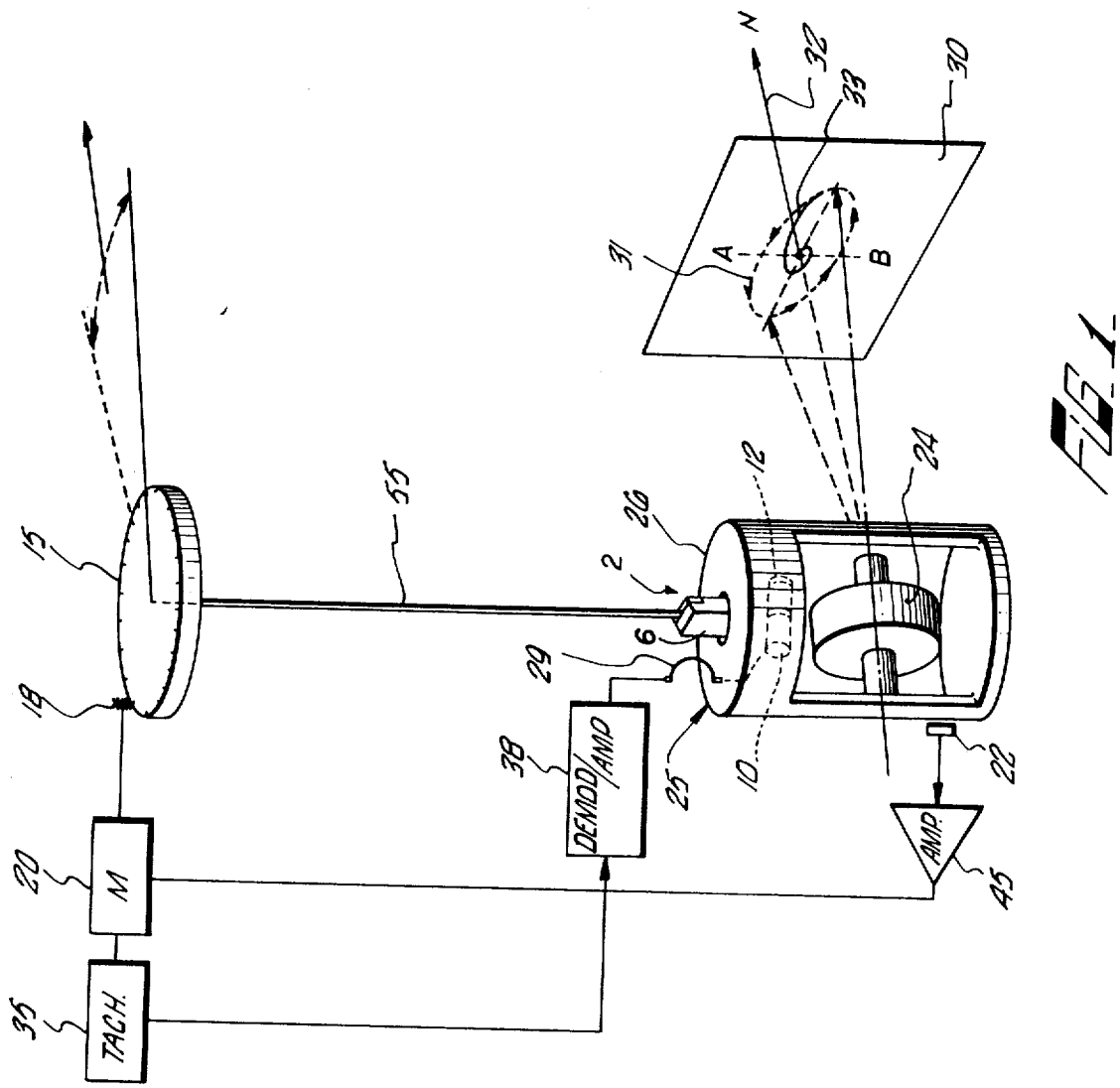
FIG. 1 is a perspective view of one embodiment of the present invention.

The gravitational torque is furnished by the pendulosity of the gyro and as can be seen in FIGS. 1 and 2, a tilt of the spin axis from the horizontal produces the gravity moment M. The present invention accomplishes its purpose of obtaining low natural pendulum periods by increasing this torque due to the pendulosity.

The Ambrosini U.S. Pat. No. 3,521,264 granted May 19, 1970, discloses, with respect to the present invention, a preferred embodiment of a north seeking gyro and this disclosure material is incorporated herein by reference.

In FIG. 1, a meridian seeking pendulous gyroscope unit 25 is suspended by a suspension band 55 within a container (not shown) oriented relative to a fixed frame (not shown) by a pick-off actuated follow-up motor 20. A damping torquer (not shown) reacting on the container and responsive to the follow-up motor rate normally urges the gyro unit 25 toward the pick-up nulling position. The pick-off signal generating devices 22 are positioned with respect to the gyroscope unit 25 so as to deliver an electrical pick-off signal which is proportional to the angle of movement of the spin axis about the vertical axis. This pick-off signal can be used in the present invention to supply a positive feedback signal for application to the driven band clamp 2 which will cause a torque about the elevation axis in phase with that from the pendulous moment M.

Referring to FIG. 1, the pendulous gyroscope unit 25 housing a gyro motor 24 is attached to a suspension band 55 by the driven band clamp 2 of the present invention. The suspension band 55 is thin and it should be understood that it serves primarily as an isolation of the pendulous gyroscope unit 25 and should not be confused with the moment arm creating the pendulosity torque as described herein. Basically, the suspension band 55 serves as a connection to the earth for the gyroscopic unit 25 and other equivalent methods of connecting the pendulous gyroscope unit 25 to earth are known in the art. The top 26 of the gyro pendulum unit 25 supports the driven band clamp 2. As can be seen from the gravity plane 30 perpendicular to the meridian 32 illustrated in FIG. 1, an exaggerated elliptical trace pattern of both an undamped and a damped pendulous gyro unit 25 is disclosed. A damped pendulous gyro path can be accomplished by various means such as the torquer coils disclosed in the Ambrosini U.S. Pat. No. 3,512,264. This tracing is helpful in disclosing the timing of the maximum lateral displacements caused by the driven band clamp. While the displacement is generally performed at a continual rate depending on the optimum torque/voltage gain relationship, the maximum displacement will occur at points A and B. Generally, gyro motion is considered to be settled for purpose of reading when the amplitude of oscillation becomes less than 20 arc-sec. By the use of the present invention, the read time can be reduced by at least one half from that of the prior art.

Referring to FIG. 2, a schematic sketch of the pendulum is provided to facilitate a mathematical understanding of the present invention. Basically, the torque derived from the pendulosity will be as follows:

$T_{p\theta}$ = weight · moment arm
$T_{p\theta} = W(l \sin \theta + D)$
$T_{p\theta} = W l \theta + W D$
$T_{p\theta} = M \theta + W D$ In the above equation, D is the band clamp lateral displacement, $l$ is the distance from the center of gravity of the pendulum to the top of the pendulum and $\theta$ is the tilt angle. Since the tilt angle will be extremely small, $\sin \theta$ can be approximated as $\theta$. Further, the vertical angular displacement resulting from the band clamp lateral displacement can be disregarded since it is also relatively minute.

Referring again to FIG. 1, the maximum displacement D would occur at points A and B of the elliptical trace path of the pendulous gyro unit 25. Trace path 31 is for an undamped pendulum and trace path 33 is for a damped pendulum.

Figure 3:
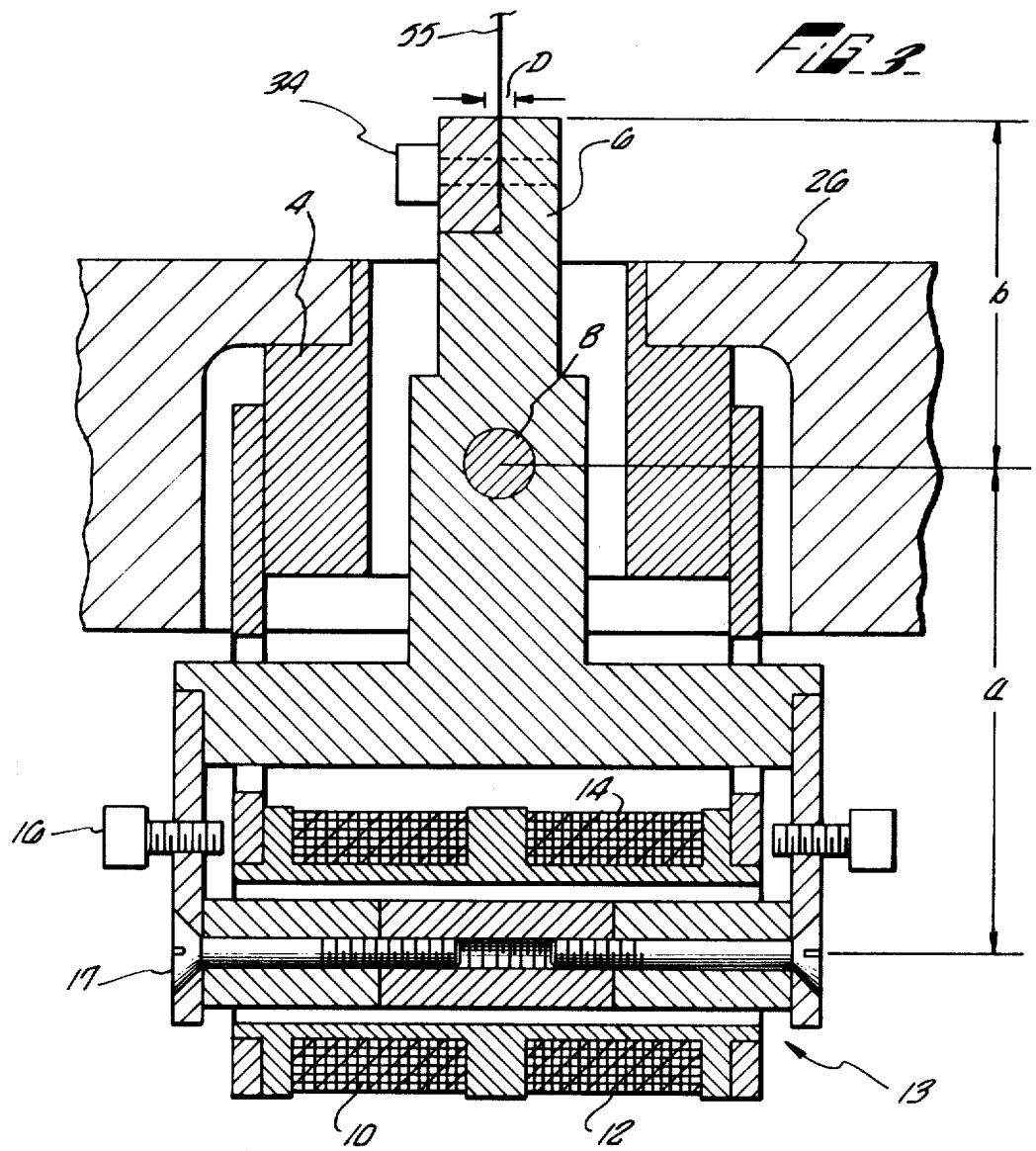
FIG. 3 is a cross-section of the torquer of the present invention.
Figure 4:
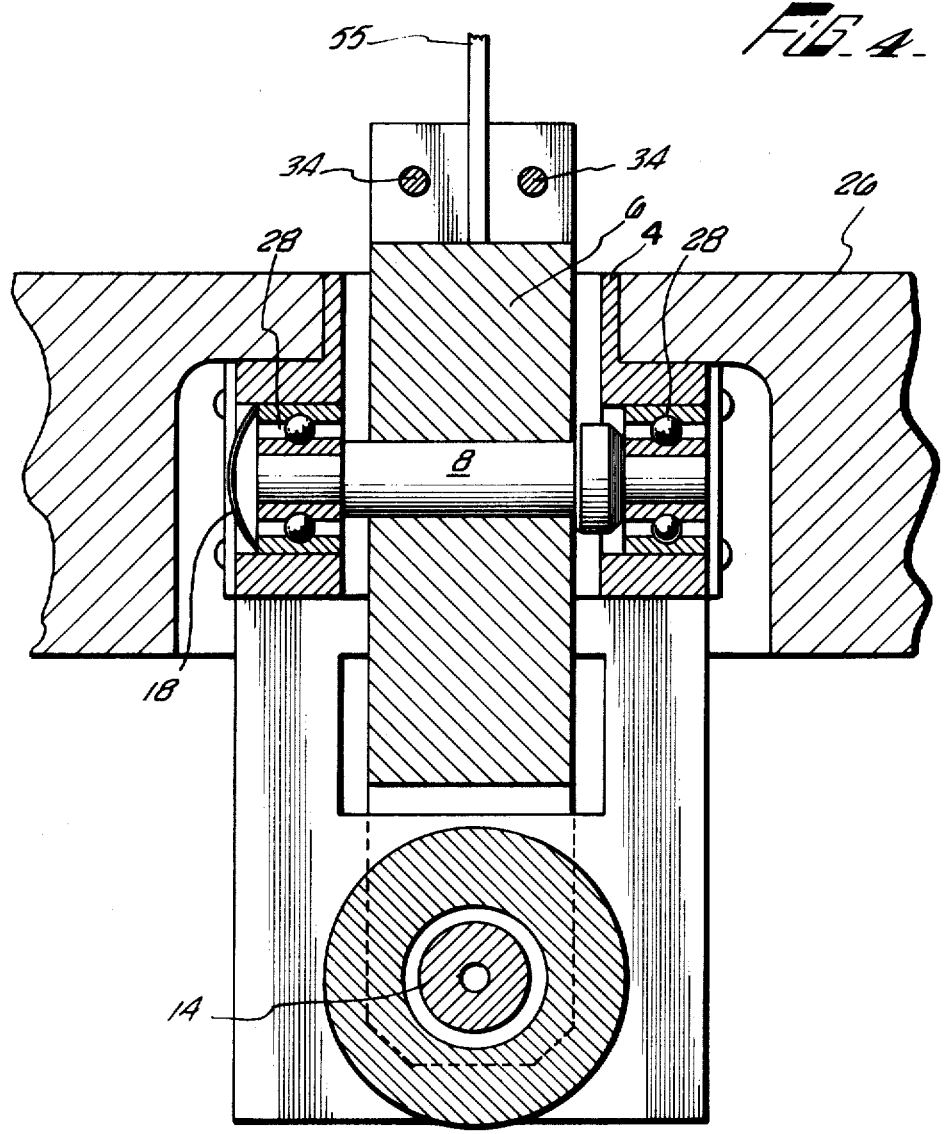
FIG. 4 is a transverse cross-section relative to FIG. 3 of the torquer of the present invention.

The driven band clamp 2 as disclosed in FIGS. 3 and 4 comprises a fastener 34 for connecting the suspension band 55 to a pivot arm 6. The pivot arm 6 rotates about the pivot shaft 8. The pivot shaft 8 is fastened through a bearing 28 and a bearing loop loading spring 18 to a pivot housing 4 that is connected to the pendulum top 26. In the preferred embodiment, a pair of solenoid coils 10 and 12 are positioned about the armature core 14 and are capable of exerting a torque force through the moment arm (a) to effectuate a displacement D through the moment arm (b). Fasteners 17 hold the core 14 in an operative position. A pair of stop adjustments 16 can regulate the maximum movement possible. It should be realized that an appropriate single solenoid coil could be utilized instead.

The power and control signals can be introduced through appropriate demodulation and amplification means 38 to the solenoid coils 10 and 12 through a curved power band 29. In operation, a pair of power transfer bands are utilized in order to balance their respective spring forces on the gyro unit 25.

Because the distance traversed by the suspension point displacement mechanism can be small and, for example, is 0.015 inch maximum for the gyro compass illustrated, the displacement can be provided by attaching the suspension band 55 directly to the end of the pivoted arm 6. When the pivot arm 6 is long enough, the motion at the point of connection of the suspension band 55 is nearly linear.

The armature core 14 and the solenoid coils 10 and 12 form a torquer 13 that is capable of rotating the pivot arm about the pivot shaft 8 causing motion of the pivot arm 6. The maximum torque required in the design evaluated, i.e., our preferred embodiment is 0.30 inch-ounces and this can be provided with a 21 amp-turn solenoid coil and a pivot arm 6 of about 1.5 inches. It is noted that other maximum torques may be used for other designs. The torque required to rotate the pivot arm 6 about the pivot axis is provided by the attractive force generated between one of the solenoid coils 10 or 12 and the armature core 14. When the motion in the opposition direction is required, the other solenoid coil is energized. The entire driven band clamp mechanism 2 is designed to be as light as practical, e.g. 33 grams, since any additional weight on the top of the pendulum gyro unit 25 raises the center of gravity which in turn reduces the pendulous moment M and causes the pendulum period P to be increased which basically would defeat the purpose of the present invention. The present invention provides an application of torque to the pendulous gyro unit 25 in a vertical plane about an axis perpendicular to the spin axis with gain and phase arranged to be cumulative to the pendulous moment M. This is accomplished by physically moving the point of attachment of the suspension band 55 on the pendulous top 26 at the appropriate time. Basically, the driven band clamp 2 will displace the point of suspension relative to the center of the pendulous top 26 as the pendulum precesses through the north direction and will center the connection point of suspension as the pendulum approaches its maximum movement to the east and west as disclosed in FIG. 1.

The control of the driven band clamp can be effectuated in a gyroscope as disclosed in the Ambrosini U.S. Pat. No. 3,512,264 by utilizing a transducer 22 such as pick-off magnets to derive a position signal such as an error signal which is amplified by, for example, any suitable high impedance input amplifier 45 to ultimately provide a positive feedback signal to the driven band clamp 2 which will cause a torque about the pendulum elevation axis. The motor 20 which drives the follower 15 through the gear 18 has a servo motor tachometer 35 for producing the control signal through appropriate demodulation and amplification means 38.

The positive feedback loop increases the pendulous moment and is stabilized by at least two external negative feedback loops such as the follow-up loop through the motor 20 and the gear train 18 to the follower 15 and through a damping torquer such as disclosed in the Ambrosini U.S. Pat. No. 3,512,264.

Figure 5:
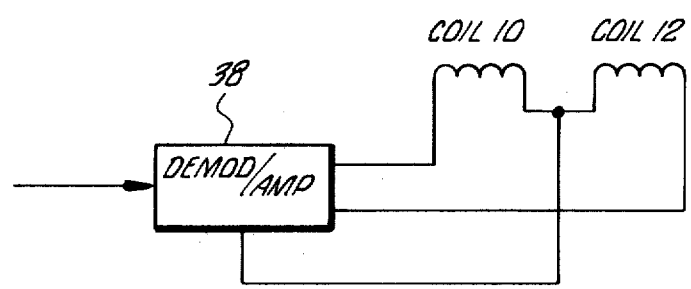
FIG. 5 is an electrical circuit schematic of one embodiment of a transducer of the present invention.

The spin axis inclination angle is proportional to the velocity of the pendulum with maximum inclination occurring at maximum velocity. The speed of the pendulum is detected by the speed of the follow-up servo which tracks the pendulum. The signal is taken from the servo motor tachometer 35. The tachometer signal is demodulated and amplified and used to drive the appropriate solenoid coil in torquer 13 as seen in FIG. 5.

Figure 6:
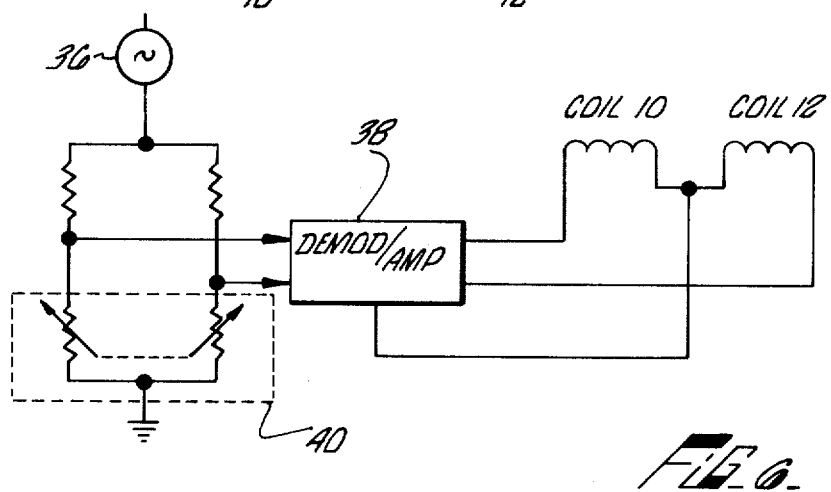
FIG. 6 is an alternative electrical schematic embodiment of another transducer of the present invention.

Referring to FIG. 6, an alternative embodiment of actuating the driven band clamp 2 of the present invention can utilize an accelerometer such as an electrolytic level transducer 40 as the sensor. The gravity sensing electrolytic transducer is a device designed to provide an output voltage having a magnitude proportional to tilt angle and a phase (approximately 0° and 180°) indicative of tilt direction when connected in an appropriate bridge circuit and excited with an AC voltage. It consists of a sealed tubular glass envelope, partially filled with an electrolytic fluid, with metal electrodes contacting the electrolytic within the sensor and providing a means for making external electrical connections through the power band 29.

When the electrolytic level transducer is connected as disclosed in FIG. 6, and is leveled so that the two output electrodes are equally immersed in the electrolytic (bubble centered), equal impedances to the common electrode will exist. The resistive bridge circuit will be balanced and an alternating current vacuum tube volt meter 36 will indicate a minimum output or null position.

Tilting of the transducer will cause the bubble to move from the center, increasing the impedance between one output electrode and the common electrode due to the reduced immersion, while the opposite change occurs at the other output electrode. The output voltage will increase since the bridge circuit is no longer balanced. This voltage is the usable output of the transducer and is proportional to the tilt angle and can be processed through appropriate demodulation and amplification to charge the appropriate solenoid coil and produce the corresponding desired displacement.

It is to be noted that any transducer, such as a force balance precision accelerometer, etc., can be used in place of the electrolytic level transducer described herein. The critical feature of the transducer that is used is the threshold level capability of the device.

While the above description discloses the preferred embodiments of the present invention, it should be clear that modifications by workers in the art within the scope of the present invention is possible and accordingly the present invention should be determined from the following claims.

What is claimed is:

1. A gyroscope comprising:
    a pendulum unit having a gyro wheel assembly with a spin axis;
    means for pendulously supporting said pendulum unit; and
    means for varying the position of the supporting means during gyro operation relative to said pendulum unit including the relative movement of the point of connection between the supporting means and said pendulum unit to provide a displacement along a path substantially parallel to the spin axis of the gyro wheel assembly for decreasing the pendulum period.

2. The gyroscope of claim 1 wherein the means for varying the position includes a torquer member mounted on said pendulum unit.

3. The gyroscope of claim 1 further including:
    means for sensing the spin axis inclination of said pendulum unit and for producing a signal representative of the inclination angle; and
    means for controlling the means for varying the position of said supporting means in response to said signal.

4. The gyroscope of claim 1 further including:
    means for sensing rotational movement of said pendulum unit;
    means for producing a signal representative of said movement; and
    means for controlling the means for varying the position of the supporting means in response to said signal.

5. The gyroscope of claim 1 wherein the means for varying the position includes a member connected to the lower end of the supporting means and which is movable traversely to the axis of the supporting means.

6. The gyroscope of claim 1 further including a transducer mounted on said pendulum unit for sensing the movement of said pendulum unit and for producing a corresponding signal and means for controlling the means for varying the position in response to the signal.

7. The gyroscope of claim 6 wherein the transducer is an electrolytic level transducer having an output signal proportional to tilt angle.

8. The gyroscope of claim 7 wherein the transducer signal has a phase indicative of tilt direction.

9. The gyroscope of claim 1 further including means for operating the means for varying the position at least twice in different directions during a single cycle of the pendulum period.

10. The gyroscope of claim 1 further including:
    means for sensing movement of said pendulum unit;
    follower means for rotating the supporting means in response to the movement;
    means for generating a corresponding signal from the follower means; and
    means for controlling the means for varying the position of the supporting means in accordance with said corresponding signal.

11. The gyroscope of claim 1 wherein the supporting means includes a band.

12. The gyroscope of claim 1 wherein the means for varying the position of the supporting means includes a pivot arm pivotably mounted on top of said pendulum unit.

13. The gyroscope of claim 12 wherein the means for positioning the supporting means further includes a motor assembly, the pivot arm attached at one end to the supporting means and at the other end to the motor assembly.

14. The gyroscope of claim 13 wherein the motor assembly includes at least one solenoid coil.

15. A gyroscope comprising:
    a pendulous gyro unit having a spin axis;
    means for pendulously supporting the gyro unit;

means for sensing the movement of the gyro unit; and means for varying the position of the pendulous support relative to the gyro unit along a path substantially parallel to the spin axis of said gyro in response to the sensing means whereby the pendulum period of the gyro unit will be decreased.

16. The gyroscope of claim 15 wherein the supporting means is a band.

17. The gyroscope of claim 15 wherein the means for sensing the movement includes a transducer mounted on the gyro unit for sensing the spin axis inclination.

18. The gyroscope of claim 16 wherein the means for varying the position includes at least one solenoid mounted on the gyro unit for moving the relative position of the band and gyro unit.

* * * * *